(12) United States Patent
Bao et al.

(10) Patent No.: US 11,321,575 B2
(45) Date of Patent: May 3, 2022

(54) METHOD, APPARATUS AND SYSTEM FOR LIVENESS DETECTION, ELECTRONIC DEVICE, AND STORAGE MEDIUM

(71) Applicant: BEIJING SENSETIME TECHNOLOGY DEVELOPMENT CO., LTD., Beijing (CN)

(72) Inventors: Tianpeng Bao, Beijing (CN); Liwei Wu, Beijing (CN); Kai Yang, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 26 days.

(21) Appl. No.: 16/876,195

(22) Filed: May 18, 2020

(65) Prior Publication Data
US 2020/0279120 A1 Sep. 3, 2020

Related U.S. Application Data

(63) Continuation of application No. PCT/CN2019/082231, filed on Apr. 11, 2019.

(30) Foreign Application Priority Data

Jul. 27, 2018 (CN) .......................... 201810846587.6

(51) Int. Cl.
*G06K 9/00* (2022.01)
*G06K 9/62* (2022.01)

(52) U.S. Cl.
CPC ..... *G06K 9/00906* (2013.01); *G06K 9/00214* (2013.01); *G06K 9/00255* (2013.01); *G06K 9/00288* (2013.01); *G06K 9/6256* (2013.01)

(58) Field of Classification Search
CPC ........... G06K 9/00906; G06K 9/00214; G06K 9/00255; G06K 9/00288; G06K 9/6256;
(Continued)

(56) References Cited

U.S. PATENT DOCUMENTS 10,237,530 B1 * 3/2019 Brailovskiy ........... H04N 13/25
2012/0197439 A1 * 8/2012 Wang ................... G05D 1/0038
700/259

(Continued)

FOREIGN PATENT DOCUMENTS

CN 105335722 A 2/2016
CN 107451510 A 12/2017
(Continued)

OTHER PUBLICATIONS

International Search Report in the international application No. PCT/CN2019/082231, dated Jul. 5, 2019, 2 pgs.
(Continued)

*Primary Examiner* — Ming Y Hon
(74) *Attorney, Agent, or Firm* — Cooper Legal Group, LLC

(57) ABSTRACT

A method for liveness detection includes: acquiring a first depth map captured by a depth sensor and a first target image captured by an image sensor; performing quality detection on the first depth map to obtain a quality detection result of the first depth map; and determining a liveness detection result of a target object in the first target image based on the quality detection result of the first depth map. The present disclosure can improve the accuracy of liveness detection.

20 Claims, 12 Drawing Sheets

(58) Field of Classification Search
CPC .............. G06K 9/6292; G06K 9/4628; G06K 9/00221; G06K 9/036; G06T 7/0002; G06T 2207/10028; G06T 2207/30168; G06T 7/0012; G06T 7/50
See application file for complete search history.

(56) References Cited

U.S. PATENT DOCUMENTS

| | | | | |
|---|---|---|---|---|
| 2013/0162763 | A1* | 6/2013 | Cheng | H04N 13/128 348/42 |
| 2013/0201184 | A1* | 8/2013 | Guo | G06T 15/08 345/419 |
| 2017/0345146 | A1 | 11/2017 | Fan et al. | |
| 2018/0084240 | A1* | 3/2018 | Campbell | H04N 13/128 |
| 2019/0034702 | A1* | 1/2019 | Hong | G06K 9/00288 |
| 2019/0147676 | A1* | 5/2019 | Madzhunkov | H04N 5/232 340/5.2 |
| 2019/0197765 | A1* | 6/2019 | Molyneaux | G06K 9/00201 |
| 2019/0347823 | A1* | 11/2019 | Yang | G06K 9/00362 |
| 2020/0074720 | A1* | 3/2020 | But | G06T 7/521 |
| 2021/0049391 | A1* | 2/2021 | Zou | G06K 9/00906 |
| 2021/0064901 | A1* | 3/2021 | Vorobiev | G06K 9/00288 |

FOREIGN PATENT DOCUMENTS

| | | |
|---|---|---|
| CN | 107633165 A | 1/2018 |
| CN | 108280418 A | 7/2018 |
| JP | 2008009769 A | 1/2008 |
| JP | 2014178969 A | 9/2014 |
| JP | 2017084065 A | 5/2017 |

OTHER PUBLICATIONS

First Office Action of the Japanese application No. 2020-527737, dated Jul. 6, 2021, 7 pgs.
English translation of the Written Opinion of the International Search Authority in the international application No. PCT/CN2019/082231, dated Jul. 5, 2019, 5 pgs.

* cited by examiner

METHOD, APPARATUS AND SYSTEM FOR LIVENESS DETECTION, ELECTRONIC DEVICE, AND STORAGE MEDIUM

CROSS-REFERENCE TO RELATED APPLICATIONS

The present application is a continuation of International Application No. PCT/CN2019/082231, filed on Apr. 11, 2019, which claims priority to Chinese Patent Application No. 201810846587.6, filed on Jul. 27, 2018. The disclosures of International Application No. PCT/CN2019/082231 and Chinese Patent Application No. 201810846587.6 are hereby incorporated by reference in their entireties.

BACKGROUND

At present, face recognition technologies are widely used in scenarios such as face unlock, face payment, unmanned supermarkets, and video surveillance. However, in face recognition technologies, there are risks of being easily attacked by a spoofing face in the form of a physical photo of a face, a digital photo of a face, a video containing a face or the like. Therefore, liveness detection is a necessary part in face recognition.

SUMMARY

The present disclosure relates to the field of computer vision technologies, and in particular, to methods, apparatuses and systems for liveness detection, electronic devices, and storage media.

In this regard, the present disclosure provides technical solutions for liveness detection.

According to one aspect of the present disclosure, provided is a method for liveness detection, including: acquiring a first depth map captured by a depth sensor and a first target image captured by an image sensor; performing quality detection on the first depth map to obtain a quality detection result of the first depth map; and determining a liveness detection result of a target object in the first target image based on the quality detection result of the first depth map.

According to one aspect of the present disclosure, provided is an apparatus for liveness detection, including: an acquiring module, configured to acquire a first depth map captured by a depth sensor and a first target image captured by an image sensor; a quality detecting module, configured to perform quality detection on the first depth map to obtain a quality detection result of the first depth map; and a first determining module, configured to determine a liveness detection result of a target object in the first target image based on the quality detection result of the first depth map.

According to one aspect of the present disclosure, provided is an apparatus for liveness detection, including: a memory storing processor-executable instructions; and a processor arranged to execute the stored processor-executable instructions to perform operations of: acquiring a first depth map captured by a depth sensor and a first target image captured by an image sensor; performing quality detection on the first depth map to obtain a quality detection result of the first depth map; and determining a liveness detection result of a target object in the first target image based on the quality detection result of the first depth map.

According to one aspect of the present disclosure, provided is an electronic device, including: a processor; and a memory configured to store processor-executable instructions; where the processor is configured to execute the foregoing method for liveness detection. According to one aspect of the present disclosure, provided is a non-transitory computer-readable storage medium, having stored thereon computer program instructions that, when executed by a processor, cause the processor to perform a method for liveness detection, the method including: acquiring a first depth map captured by a depth sensor and a first target image captured by an image sensor; performing quality detection on the first depth map to obtain a quality detection result of the first depth map; and determining a liveness detection result of a target object in the first target image based on the quality detection result of the first depth map.

According to one aspect of the present disclosure, provided is a system for liveness detection, comprising: the electronic device, the depth sensor, and the image sensor.

According to one aspect of the present disclosure, provided is a system for liveness detection, comprising: the computer-readable storage medium, the depth sensor, and the image sensor.

According to one aspect of the present disclosure, provided is an electronic device, including: a depth sensor, configured to detect a first depth map of a target object; an image sensor, configured to capture a first target image including the target object; and a processor, configured to perform quality detection on the first depth map to obtain a quality detection result of the first depth map, and to determine a liveness detection result of a target object in the first target image based on the quality detection result of the first depth map.

The other features and aspects of the present disclosure can be described more clearly according to the detailed descriptions of the exemplary embodiments in the accompanying drawings.

BRIEF DESCRIPTION OF DRAWINGS

The accompanying drawings included in the specification and constituting a part of the specification illustrate the exemplary embodiments, features, and aspects of the present disclosure together with the specification, and are used for explaining the principles of the present disclosure.

DETAILED DESCRIPTION

The various exemplary embodiments, features, and aspects of the present disclosure are described below in detail with reference to the accompanying drawings. The same signs in the accompanying drawings represent elements having the same or similar functions. Although the various aspects of the embodiments are illustrated in the accompanying drawings, unless stated particularly, it is not required to draw the accompanying drawings in proportion.

The special term "exemplary" herein means "used as examples, embodiments, or descriptions". Any embodiment herein illustrated by the term "exemplary" is not necessarily construed as being superior to or better than other embodiments.

In addition, numerous details are given in the following detailed description for the purpose of better explaining the present disclosure. It should be understood by persons skilled in the art that the present disclosure can still be implemented even without some of those details. In some of the examples, methods, means, elements, and circuits that are well known to persons skilled in the art are not described in detail so that the principle of the present disclosure becomes apparent.

Figure 1:
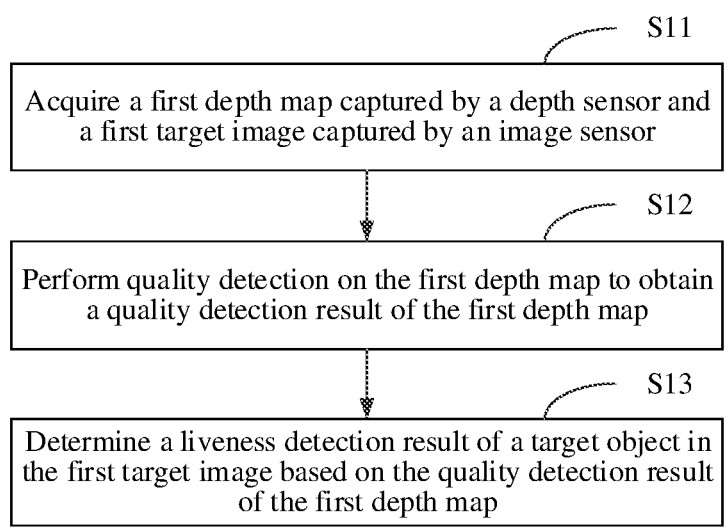
FIG. 1 shows a flowchart of a method for liveness detection according to embodiments of the present disclosure.

FIG. 1 shows a flowchart of a method for liveness detection according to embodiments of the present disclosure. The method is applicable to a terminal device having a face recognition function, such as a mobile phone, a tablet computer, a digital camera, or an access control device. The method is applicable to the scenarios such as registration of online accounts, access control systems, face unlock, face payment, assistant driving, unmanned supermarkets, video surveillance, Automatic Teller Machines (ATMs), ticket checking machines in stations, ticket checking machines in airports, or intelligent buildings. In some possible implementations, the living detection method may be implemented by a processor by invoking computer-readable instructions stored in a memory.

As shown in FIG. 1, the method includes operations S11 to S13.

In operation S11, a first depth map captured by a depth sensor and a first target image captured by an image sensor are acquired.

In embodiments of the present disclosure, the target image includes a target object, where the target image may be a static image or a video frame image. For example, the target image may be an image selected from a video sequence, where an image may be selected from a video sequence in various ways. In one specific example, the target image is an image selected from a video sequence that satisfies a predetermined quality condition, where the predetermined quality condition may include one or a combination of any of the following: whether a target object is included, whether the target object is located in a central region of the image, whether the target object is completely contained in the image, a proportion of the target object in the image, the state or orientation of the target object, image sharpness, image exposure, and the like. No limitation is made thereto in the embodiments of the present disclosure.

The target object may be at least a portion of a face, a body, an animal, or other living object. No limitation is made thereto in the embodiments of the present disclosure. In a possible implementation, the target object may be a face.

The first depth map corresponds to the first target image. For example, the first depth map and the first target image are respectively captured by the depth sensor and the image sensor for a same scenario, or the first depth map and the first target image are captured by the depth sensor and the image sensor at a same moment for a same target region. However, no limitation is made thereto in the embodiments of the present disclosure.

In the embodiments of the present disclosure, the depth sensor is configured to capture depth information, and the image sensor is configured to capture a two-dimensional image.

In some embodiments, the depth sensor is a three-dimensional sensor. For example, the depth sensor may be a Time-of-Flight (ToF) sensor or a structured light sensor. The structured light sensor may be an encoded structured light sensor or a speckle structured light sensor. A depth map with high precision may be captured by obtaining a depth map of the target object by means of the three-dimensional sensor. In the embodiment of the present disclosure, liveness detection is performed by using a depth map including a target object, and depth information of the target object can be fully mined, thereby improving the accuracy of liveness detection. For example, if the target object is a face, in the embodiments of the present disclosure, liveness detection is performed by using a depth map including a face, and depth information of face data can be fully mined, thereby improving the accuracy of face liveness detection.

In some embodiments, the image sensor is a Red-Green-Blue (RGB) sensor or a near-infrared sensor. If the image sensor is an RGB sensor, the target image captured by the image sensor is an RGB image. If the image sensor is a near-infrared sensor, the target image captured by the image sensor is a near-infrared image. The near-infrared image may be a near-infrared image with a light spot or a near-infrared image without a light spot.

It should be noted that, although the depth sensor is described by taking the TOF sensor and the structured light sensor as an example, and the image sensor is described by taking the RGB sensor and the near-infrared sensor as an example, persons skilled in the art can understand that the embodiments of the present disclosure are not limited thereto. Persons skilled in the art may select the types of the depth sensor and the image sensor according to actual application requirements as long as the depth map and the image can be captured respectively.

In operation S12, quality detection is performed on the first depth map to obtain a quality detection result of the first depth map.

In some embodiments, the quality detection result of the first depth map is qualified in quality or unqualified in quality.

In some specific scenarios (such as a scenario with strong light outside), large-area or complete invalidation of a depth map would easily occur for the depth sensor (such as a TOF sensor or a structural light sensor). Moreover, under normal light, local invalidation of the depth map may also be randomly caused by factors such as light reflection of glasses, black hair, or frames of black glasses. Moreover, some special paper can cause a printed face photo to generate a similar effect of large-area or local invalidation of a depth map. In addition, the depth map may also become invalid by blocking an active light source of the depth sensor, while imaging of a non-living body in the image sensor is normal. Therefore, in some cases where the depth map of the target object is invalid, the depth map of the target object is inadequate to distinguish a living body with a non-living body, and may even has an adverse effect. Thus, in the embodiments of the present disclosure, quality detection is performed on the first depth map and appropriate processing is performed in the case that a quality detection result is unqualified, so as to avoid the adverse effect of the first depth map in liveness detection.

In operation S13, a liveness detection result of the target object in the first target image is determined based on the quality detection result of the first depth map.

In some implementations, the liveness detection result of the target object may be the target object being a living body or the target object being a non-living body.

In some embodiments, the determining of the liveness detection result of the target object in the first target image based on the quality detection result of the first depth map includes: in response to the quality detection result of the first depth map being qualified in quality, obtaining a liveness detection result of the target object based on the first depth map and the first target image.

In some embodiments, the obtaining of the liveness detection result of the target object based on the first depth map and the first target image includes: obtaining a liveness detection result of the target object based on the first depth map and key point information of the target object contained in the first target image. In some embodiments, a first region image in the first depth map corresponding to the target object and a second region image in the first target image corresponding to the target object are respectively determined based on the key point information of the target object; and the liveness detection result of the target object is obtained based on the first region image and the second region image. In one specific example, key point information of the target object contained in the first target image may be acquired, and a liveness detection result of the target object is obtained based on the first depth map and the key point information of the target object contained in the first target image.

In the implementation, if the quality detection result of the first depth map being qualified in quality, the first depth map and the key point information of the target object contained in the first target image are combined for liveness detection. By adding a depth map in liveness detection, an attack with a high-definition seamless image (this type of attack would easily break through a monocular liveness detection technology) can be effectively defended, thereby improving the accuracy of liveness detection.

In some other embodiments, the determining of the liveness detection result of the target object in the first target image based on the quality detection result of the first depth map includes: in response to the quality detection result of the first depth map being unqualified in quality, determining that the liveness detection result of the target object is that the target object is a non-living body. For example, when it is not required to consider a scenario with strong light outside in a certain application scenario, or a probability of being unqualified in quality of the depth map is far lower than a predetermined probability, if the quality detection result of the first depth map is unqualified in quality, it may be directly determined that the liveness detection result of the target object is the target object being a non-living body. The predetermined probability represents a preset maximum probability of a living body being erroneously determined as a non-living body.

In some other embodiments, the determining of the liveness detection result of the target object in the first target image based on the quality detection result of the first depth map includes: in response to the quality detection result of the first depth map being unqualified in quality, performing liveness detection on the target object, without using the first depth map, to obtain a liveness detection result of the target object. That is to say, the liveness detection result of the target object is obtained based on a processing result of the first target image. In the implementation, if the quality detection result of the first depth map is unqualified in quality, the liveness detection result of the target object may be obtained based on the monocular liveness detection technology. The embodiments of the present disclosure do not limit the implementation of the obtaining the liveness detection result of the target object based on the processing result of the target image. For example, when it is required to consider a scenario with strong light outside in a certain application scenario, under outdoor strong light, there is a large probability of being unqualified in quality of the depth map. In this case, liveness detection may be performed by using the monocular liveness detection technology, so as to prevent as much as possible the living body from being erroneously determined as a non-living body.

In some other embodiments, the first target image may be a video frame image, for example, an image selected from a video sequence. In this case, quality detection may be performed on a depth map corresponding to a certain image selected from a video sequence. If the quality detection result is unqualified in quality, quality detection may be performed on a depth map corresponding to another image selected from the video sequence, and the number of retries is increased by 1 until the number of retries reaches the maximum number of retries, or until a qualified depth map is detected, or until it is determined that the liveness detection result of the target object is that the target object is a non-living body based on a certain qualified depth map. No limitation is made thereto in the embodiments of the present disclosure.

In one specific example, the determining of the liveness detection result of the target object in the first target image based on the quality detection result of the first depth map includes: in response to the quality detection result of the first depth map being unqualified in quality and number of retries of the quality detection on a video sequence to which the first target image belongs reaches a second threshold, determining that the liveness detection result of the target object is that the target object is a non-living body, or performing liveness detection on the target object, without using the first depth map, to obtain a liveness detection result of the target object. In the implementations, if the quality detection result of the first depth map is unqualified in quality and number of retries of the quality detection on a video sequence to which the first target image belongs reaches a second threshold, it may be directly determined that the liveness detection result of the target object is that the target object is a non-living body, or the liveness detection result of the target object is obtained based on the monocular liveness detection technology.

In some other embodiments, the determining of the liveness detection result of the target object in the first target image based on the quality detection result of the first depth map includes: in response to the quality detection result of the first depth map being unqualified in quality and number of retries of the quality detection of the video sequence to which the first target image belongs does not reach the second threshold, performing quality detection on a second depth map corresponding to a second target image in the video sequence, to which the target image belongs, to obtain a quality detection result of the second depth map; and obtaining a liveness detection result of the target object based on the quality detection result of the second depth map. In one specific example, if the quality detection result of the second depth map is qualified in quality, the liveness detection result of the target object may be obtained based on the second depth map and the second target image. In another specific example, if the quality detection result of the second depth map is unqualified in quality, whether the current number of retries of quality detection reaches the second threshold may be determined; and if the second threshold is reached, it is determined that the target object is not a living body, or the liveness detection result of the target object is determined based on a processing result of the second target image. No limitation is made thereto in the embodiments of the present disclosure.

According to the embodiments of the present disclosure, a first depth map captured by a depth sensor and a first target image captured by an image sensor are acquired, quality detection is performed on the first depth map to obtain a quality detection result of the first depth map, and a liveness detection result of a target object in the first target image is determined based on the quality detection result of the first depth map, thereby improving the accuracy of liveness detection.

Figure 2:
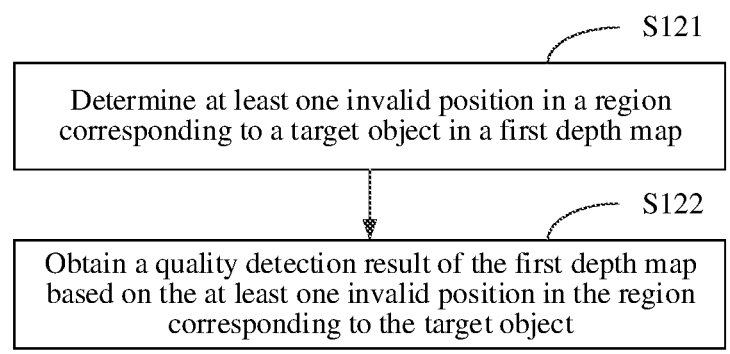
FIG. 2 shows one exemplary flowchart of performing quality detection on a first depth map in the method for liveness detection according to embodiments of the present disclosure.

FIG. 2 shows one exemplary flowchart of operation S12 in the method for liveness detection according to embodiments of the present disclosure. As shown in FIG. 2, operation S12 may include operations S121 and S122.

In operation S121, at least one invalid position in a region corresponding to a target object in a first depth map is determined.

In some embodiments, the invalid position in the region corresponding to the target object may be determined based on a depth value of each of at least one pixel point in the first depth map, or, based on a depth value of each of at least one pixel point included in the region corresponding to the target object.

In one specific example, a depth sensor sets the depth value of the invalid position to be 0 by default, and in this case, a position in the region corresponding to the target object, which has a depth value equal to zero, may be determined as the invalid position.

In another specific example, the depth sensor sets the depth value of the invalid position to be one or more predetermined values or a predetermined range, and a position in the region corresponding to the target object, which has a depth value equal to the predetermined value or belonging to the predetermined range, may be determined as the invalid position.

In the embodiments of the present disclosure, the invalid position in the region corresponding to the target object may also be determined based on other statistical approaches. No limitation is made thereto in the embodiments of the present disclosure.

In operation S122, a quality detection result of the first depth map is obtained based on the at least one invalid position in the region corresponding to the target object.

In some embodiments, the obtaining of the quality detection result of the first depth map based on the at least one invalid position in the region corresponding to the target object includes: obtaining a quality detection result of the first depth map based on a proportion of the at least one invalid position in the region corresponding to the target object.

In some embodiments, a quality detection result of the region corresponding to the first depth map or the target object may be obtained based on the proportion of the number of invalid positions or pixel points in the total numbers of positions or pixel points included in the region corresponding to the target object.

As one example, the number of pixel points included in the at least one invalid position in the region corresponding to the target object in the first depth map may be determined, the total number of pixels included in the region corresponding to the target object in the first depth map is determined, and the ratio of the number of the pixels included in the at least one invalid position to the total number of the pixels included in the region corresponding to the target object is calculated, which ratio is used as the proportion of the at least one invalid position in the region corresponding to the target object.

As one example, the obtained proportion may be compared with a predetermined value (for example, a third threshold) to determine the quality detection result of the first depth map. For example, if the proportion of the at least one invalid position in the region corresponding to the target object is less than or equal to the third threshold, it is determined that the quality detection result of the first depth map is qualified in quality. For another example, if the proportion of the at least one invalid position in the region corresponding to the target object is greater than the third threshold, it is determined that the quality detection result of the first depth map is unqualified in quality.

In the implementations, if the proportion, in the region corresponding to the target object, of the at least one invalid position in the region corresponding to the target object is greater than the third threshold, the remaining depth map is inadequate to distinguish a living body with a non-living body, and in this case, it may be determined that the quality detection result of the first depth map is unqualified in quality.

In the implementations, the quality detection result of the first depth map is obtained based on a proportion of the at least one invalid position in the region corresponding to the target object, and thus quality determination is performed on the first depth map by using a statistic method, which is intuitive and simple.

In the embodiments of the present disclosure, if the of the at least one invalid position in the region corresponding to the target object is greatly different from the third threshold (for example, the proportion of the at least one invalid position in the region corresponding to the target object is much greater than the third threshold or the proportion of the at least one invalid position in the region corresponding to the target object is much less than the third threshold), by comparing the proportion of the at least one invalid position in the region corresponding to the target object with the third threshold, an accurate quality detection result can be obtained.

In the foregoing implementations, each position in the region corresponding to the target object is considered to be identical. In some other embodiments, different weights may be assigned to different positions in the region corresponding to the target object, and the quality detection result of the depth map is determined based on the invalid position in the region corresponding to the target object and the weight of the invalid position. In this case, the obtaining of the quality detection result of the first depth map based on the at least one invalid position in the region corresponding to the target object includes: obtaining the quality detection result of the first depth map based on the at least one invalid position in the region corresponding to the target object and the weight corresponding to the at least one invalid position.

For example, in the cases with a same number of pixel points with an invalid depth, if the pixel points appear on non-key parts such as the edge of a face or cheek, the influence on liveness detection is not great; and if the pixel points appear on key parts such as an eye and a nose, a great interference on the liveness detection would be caused. Therefore, the pixels with an invalid depth at different positions have different degrees of influence on the quality of the depth map. Thus, by assigning different weights to different positions, and obtaining the quality detection result of the first depth map based on the at least one invalid position in the region corresponding to the target object and the weight corresponding to the at least one invalid position, a more accurate quality detection result can be obtained.

As one example, the obtaining of the quality detection result of the first depth map based on the at least one invalid position in the region corresponding to the target object and the weight corresponding to the at least one invalid position includes: obtaining a quality confidence score corresponding to the first depth map based on the at least one invalid position in the region corresponding to the target object and the weight corresponding to the at least one invalid position; and obtaining the quality detection result of the first depth map based on the quality confidence score corresponding to the first depth map.

In the embodiments of the present disclosure, the quality confidence score may be determined in various ways. For example, the at least one invalid position may be processed through a neural network to obtain the quality confidence score corresponding to the depth map, and in this case, the weight corresponding to the invalid position may be obtained by training the neural network. Alternatively, the weight may be predetermined, and in this case, the at least one invalid position and the weight corresponding thereto may be processed through the neural network to obtain the quality confidence score corresponding to the depth map. No limitation is made thereto in the embodiments of the present disclosure.

In some embodiments, the quality detection result of the first depth map may be determined by comparing the quality confidence score with a predetermined value. For example, if the quality confidence score is greater than or equal to a fourth threshold, it is determined that the first depth map is qualified. However, no limitation is made thereto in the embodiments of the present disclosure.

In the embodiments of the present disclosure, for example, higher weights may be assigned to the key parts such as eyes and the nose, and lower weights are assigned to other non-key parts. The quality confidence score of the first depth map is obtained based on the weights of different positions and the number of invalid pixels, where the weights of the key parts are greater than the weights of the non-key parts, but the assignments of the weights for different positions may be determined based on actual situations, and no limitation is made thereto in the embodiments of the present disclosure.

Figure 3:
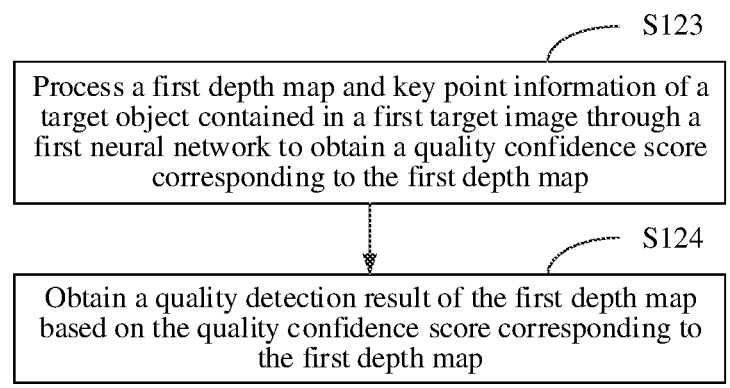
FIG. 3 shows another exemplary flowchart of performing quality detection on the first depth map in the method for liveness detection according to embodiments of the present disclosure.

FIG. 3 shows another exemplary flowchart of operation S12 in the method for liveness detection according to embodiments of the present disclosure. As shown in FIG. 3, operation S12 may include operations S123 and S124.

In operation S123, the first depth map is processed through a first neural network to obtain a quality confidence score corresponding to the first depth map.

In this example, a first depth map is input into a neural network or a region corresponding to the target object in the first depth map may be input into the neural network. No limitation is made thereto in the embodiments of the present disclosure.

In some embodiments, the first neural network may perform processing on the first depth map or the region corresponding to the target object to obtain at least one invalid position in the region corresponding to the target object. Then, a quality detection result of the depth map is determined by the neural network or other means based on the at least one invalid position.

In one example, the first neural network may assign different weights to different invalid positions in the region corresponding to the target object.

In some embodiments, training data of the depth map may be manually divided into qualified depth maps and unqualified depth maps, and then the first neural network is trained by using the two types of images, i.e., the qualified depth maps and the unqualified depth maps.

In operation S124, the quality detection result of the first depth map is obtained based on the quality confidence score corresponding to the first depth map.

In some embodiments, the obtaining of the quality detection result of the first depth map based on the quality confidence score corresponding to the first depth map includes: in response to the quality confidence score corresponding to the first depth map being greater than a first threshold, determining that the quality detection result of the first depth map is qualified in quality; and/or in response to the quality confidence score corresponding to the first depth map being less than or equal to the first threshold, determining that the quality detection result of the first depth map is unqualified in quality.

In the embodiments of the present disclosure, the region corresponding to the target object may be determined from the first depth map. In some embodiments, the method further includes: performing key point detection on the first target image to obtain key point information of the target object; and determining, based on the key point information of the target object, the region corresponding to the target object from the first depth map.

The key point information of the target object may include position information of a key point of the target object.

In the embodiments of the present disclosure, if the target object is a face, the key point of the target object may include one or more of key points of an eye, key points of an eyebrow, key points of a nose, key points of a mouth, key points of a facial contour, etc. The key point of an eye may include one or more of key points of an eye contour, key points of a canthus, key points of a pupil, etc.

In some embodiments, the determining, based on the key point information of the target object, the region corresponding to the target object from the first depth map includes:

determining, based on key points of a contour of the target object, the region corresponding to the target object from the first depth map. For example, the target object is a face, the region corresponding to the target object is determined from the first depth map according to the key points of the facial contour.

In some embodiments, the contour of the target object may be determined based on the key point information of the target object, and the region where the contour of the target object is located is determined as the region corresponding to the target object, or the region obtained by magnifying the region where the contour of the target object is located by a certain multiple is determined as the region corresponding to the target object. For example, an elliptical region determined based on the key point information of the target object may be determined as the region corresponding to the target object, or the minimum bounding rectangular region of the elliptical region may be determined as the region corresponding to the target object. However, no limitation is made thereto in the embodiments of the present disclosure.

In some embodiments, before performing key point detection on the first target image, the method further includes: aligning the first depth map with the first target image according to a parameter of a depth sensor and a parameter of an image sensor.

As one example, transformation processing may be performed on the first depth map, so that the first depth map after the transformation processing is aligned with the first target image. For example, a transformation matrix from a parameter matrix of the depth sensor to a parameter matrix of the image sensor may be determined according to the parameter matrix of the depth sensor and the parameter matrix of the image sensor; and the first depth map is transformed according to the transformation matrix.

As another example, transformation processing may be performed on the first target image, so that the first target image after the transformation processing is aligned with the first depth map. For example, a transformation matrix from the parameter matrix of the image sensor to the parameter matrix of the depth sensor may be determined according to the parameter matrix of the depth sensor and the parameter matrix of the image sensor; and the first target image is transformed according to the transformation matrix.

In the embodiments of the present disclosure, the parameter of the depth sensor may include an intrinsic parameter and/or an extrinsic parameter of the depth sensor, and the parameter of the image sensor may include the intrinsic parameter and/or the extrinsic parameter of the image sensor.

In the embodiments of the present disclosure, by aligning the first depth map with the first target image, the positions of corresponding portions in the first depth map and the first target image are the same in the two images.

Figure 4:
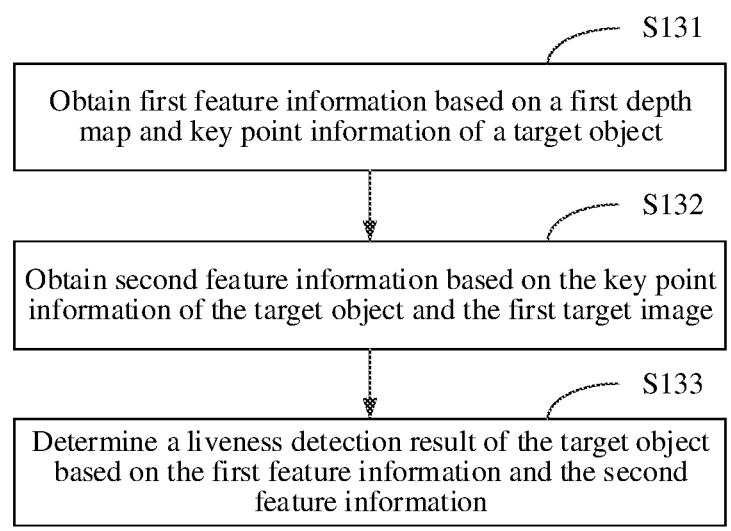
FIG. 4 shows one exemplary flowchart of obtaining a liveness detection result of a target object based on the first depth map and a first target image in the method for liveness detection according to embodiments of the present disclosure.

FIG. 4 shows one exemplary flowchart of operation S13 of the method for liveness detection according to embodiments of the present disclosure. As shown in FIG. 4, operation S13 may include operations S131 to S133.

In operation S131, first feature information is obtained based on the first depth map and key point information of the target object.

In some embodiments, the obtaining of the first feature information based on the first depth map and key point information of the target object includes: processing the first depth map and key point information of the target object through a second neural network to obtain first feature information.

As one example, the second neural network may include a convolution layer, a down-sampling layer, and a fully connected layer.

For example, the second neural network may include one stage of convolution layers, one stage of down-sampling layers, and one stage of fully connected layers. The stage of convolution layers may include one or more convolution layers, the stage of down-sampling layer may include one or more down-sampling layers, and the stage of fully connected layers may include one or more fully connected layers.

For another example, the second neural network may include multiple stages of convolution layers, multiple stages of down-sampling layers, and one stage of fully connected layers. Each stage of convolution layers may include one or more convolution layers, each stage of down-sampling layer may include one or more down-sampling layers, and the stage of fully connected layers may include one or more fully connected layers. The ith-stage of down-sampling layers are cascaded after the ith-stage of convolution layers, the (i+1)th-stage of convolution layers are cascaded after ith-stage of down-sampling layers, and the fully connected layer is cascaded after the nth-stage of down-sampling layers, where i and n are both positive integers, $1 \le i \le n$, and n represents the number of both the stages of the convolution layers and the stages of the down-sampling layers in the second neural network.

As another example, the second neural network may include a convolution layer, a down-sampling layer, a normalization layer, and a fully connected layer.

For example, the second neural network may include one stage of convolution layers, one normalization layer, one stage of down-sampling layers, and one stage of fully connected layers. The stage of convolution layers may include one or more convolution layers, the stage of down-sampling layers may include one or more down-sampling layers, and the stage of fully connected layers may include one or more fully connected layers.

For another example, the second neural network may include multiple stages of convolution layers, multiple normalization layers, multiple stages of down-sampling layers, and one stage of fully connected layers. Each stage of convolution layers may include one or more convolution layers, each stage of down-sampling layers may include one or more down-sampling layers, and the stage of fully connected layers may include one or more fully connected layers. The ith normalization layer is cascaded after the ith-stage of convolution layers, the ith-stage of down-sampling layers are cascaded after the ith normalization layer, the (i+1)th-stage of convolution layers are cascaded after ith-stage of down-sampling layers, and the fully connected layer is cascaded after the nth-stage of down-sampling layers, where i and n are both positive integers, $1 \le i \le n$, and n represents the number of both the stages of the convolution layers and the stages of the down-sampling layers in the second neural network and the number of the normalization layers.

In operation S132, second feature information is obtained based on the key point information of the target object and the first target image.

In some embodiments, the obtaining of the second feature information based on the key point information of the target object and the first target image includes: processing the first target image and the key point information of the target object through a third neural network to obtain second feature information.

As one example, the third neural network may include a convolution layer, a down-sampling layer, and a fully connected layer.

For example, the third neural network may include one stage of convolution layers, one stage of down-sampling layers, and one stage of fully connected layers. The stage of convolution layers may include one or more convolution layers, the stage of down-sampling layers may include one or more down-sampling layers, and the stage of fully connected layers may include one or more fully connected layers.

For another example, the third neural network may include multiple stages of convolution layers, multiple stages of down-sampling layers, and one stage of fully connected layers. Each stage of convolution layers may include one or more convolution layers, each stage of down-sampling layers may include one or more down-sampling layers, and the stage of fully connected layers may include one or more fully connected layers. The jth-stage of down-sampling layers is cascaded after the jth-stage of convolution layers, the (j+1)th-stage of convolution layers is cascaded after jth-stage of down-sampling layers, and the fully connected layer is cascaded after the mth-stage of down-sampling layers, where j and m are both positive integers, $1 \leq j \leq m$, and m represents the number of both the stages of the convolution layers and the stages of the down-sampling layers in the second neural network.

As another example, the third neural network may include a convolution layer, a down-sampling layer, a normalization layer, and a fully connected layer.

For example, the third neural network may include one stage of convolution layers, one normalization layer, one stage of down-sampling layers, and one stage of fully connected layers. The stage of convolution layers may include one or more convolution layers, the stage of down-sampling layers may include one or more down-sampling layers, and the stage of fully connected layers may include one or more fully connected layers.

For another example, the third neural network may include multiple stages of convolution layers, multiple normalization layers, multiple stages of down-sampling layers, and one stage of fully connected layers. Each stage of convolution layers may include one or more convolution layers, each stage of down-sampling layers may include one or more down-sampling layers, and the stage of fully connected layers may include one or more fully connected layers. The jth normalization layer is cascaded after the jth-stage of the convolution layers, the jth-stage of down-sampling layers is cascaded after the jth normalization layer, the (j+1)th-stage of convolution layers is cascaded after jth-stage of down-sampling layers, and the fully connected layer is cascaded after the mth-stage of down-sampling layers, where j and m are both positive integers, $1 \leq j \leq m$, and m represents the number of both the stages of the convolution layers and the stages of the down-sampling layers in the third neural network and the number of the normalization layers.

In some embodiments, the second neural network and the third neural network have the same network structure.

In operation S133, a liveness detection result of the target object is determined based on the first feature information and the second feature information.

It should be noted that, as long as operations S131 and S132 are executed before operation S133, the embodiments of the present disclosure do not define the sequence of executing operations S131 and S132. For example, operation S131 may be executed first and operation S132 is then executed, or operation S132 may be executed first and operation S131 is then executed, or operations S131 and S132 may be simultaneously executed.

In some embodiments, at S131, a first region image is obtained based on the first depth map and key point information of the target object, such as, for example, the first region image corresponding to the target object is obtained from the depth map based on the key point information of the target object, and the first feature information is extracted from the first region image. For one example, the first region image is input into a second neural network for feature extraction processing, to obtain the first feature information. For another example, the first depth map and the key point information of the target object are input into the second neural network, and the second neural network first obtains the first region image from the first depth map based on the key point information of the target object, and then extracts feature information of the first region image, i.e., the first feature information.

In some embodiments, at S131, feature extraction is performed on the first depth map based on the key point information of the target object, to obtain the first feature information, but the present disclosure is not limited hereto.

In one embodiment, likewise, at S132, a second region image is obtained from the first target image based on the key point information of the target object, for example, a second region image corresponding to the target object may be obtained from the first target image, i.e., the second region image is the region where the target object is located, and the second feature information may be obtained by feature extraction performed on the second region image. For one example, the second region image is input into a third neural network for feature extraction processing, to obtain the second feature information. For another example, the first target image and the key point information of the target object are input into the third neural network, and the third neural network first obtains a second region image from the first target image based on the key point information of the target object, and then extracts feature information of the second region image, i.e., the second feature information.

In some embodiments, at S132, feature extraction is performed on the first target image based on the key point information of the target object, to obtain the second feature information, but the present disclosure is not limited hereto.

Figure 5:
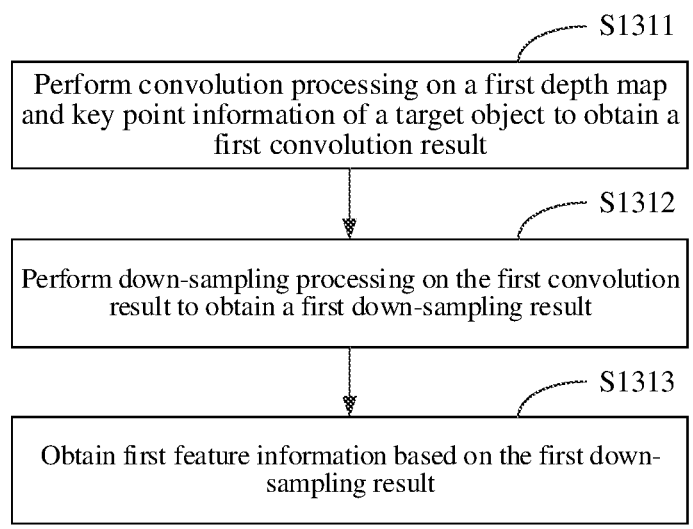
FIG. 5 shows one exemplary flowchart of obtaining first feature information based on the first depth map and key point information of the target object in the method for liveness detection according to embodiments of the present disclosure.

FIG. 5 shows one exemplary flowchart of obtaining first feature information based on the first depth map and key point information of the target object in the method for liveness detection according to embodiments of the present disclosure. As shown in FIG. 5, first feature information is obtained based on the first depth map and key point information of the target object. Operation S1311 to operation S1313 may be included.

In operation S1311, convolution processing is performed on the first depth map and the key point information of the target object to obtain a first convolution result.

In operation S1312, down-sampling processing is performed on the first convolution result to obtain a first down-sampling result.

In some embodiments, convolution processing and down-sampling processing may be performed on the first depth map and the key point information of the target object by means of one stage of convolution layers and one stage of down-sampling layers. The stage of convolution layers may include one or more convolution layers, and the stage of down-sampling layers may include one or more down-sampling layers.

In some other embodiments, convolution processing and down-sampling processing may be performed on the first depth map and the key point information of the target object by means of multiple stages of convolution layers and multiple stages of down-sampling layers. Each stage of convolution layers may include one or more convolution layers, and each stage of down-sampling layers may include one or more down-sampling layers.

In some embodiments, the performing of the down-sampling processing on the first convolution result to obtain a first down-sampling result may include: performing normalization processing on the first convolution result to obtain a first normalization result; and performing down-sampling processing on the first normalization result to obtain a first down-sampling result.

In operation S1313, first feature information is obtained based on the first down-sampling result.

In some embodiments, the first down-sampling result may be input to a fully connected layer, and full connection processing is performed on the first down-sampling result by means of the fully connected layer to obtain first feature information.

Figure 6:
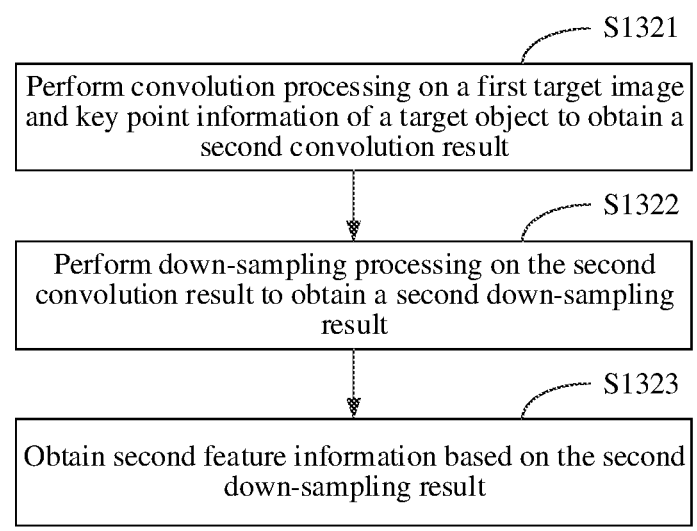
FIG. 6 shows one exemplary flowchart of obtaining second feature information based on key point information of the target object in the method for liveness detection according to embodiments of the present disclosure.

FIG. 6 shows one exemplary flowchart of obtaining second feature information based on key point information of the target object in the method for liveness detection according to embodiments of the present disclosure. As shown in FIG. 6, second feature information is obtained based on key point information of the target object. Operations S1321 to S1323 may be included.

In operation S1321, convolution processing is performed on a first target image and key point information of a target object to obtain a second convolution result.

In operation S1322, down-sampling processing is performed on the second convolution result to obtain a second down-sampling result.

In some embodiments, convolution processing and down-sampling processing may be performed on the first target image and the key point information of the target object by means of one stage of convolution layers and one stage of down-sampling layers. The stage of convolution layers may include one or more convolution layers, and the stage of down-sampling layers may include one or more down-sampling layers.

In some other embodiments, convolution processing and down-sampling processing may be performed on the first target image and the key point information of the target object by means of multiple stages of convolution layers and multiple stages of down-sampling layers. Each stage of convolution layers may include one or more convolution layers, and each stage of down-sampling layers may include one or more down-sampling layers.

In some embodiments, the performing of the down-sampling processing on the second convolution result to obtain the second down-sampling result may include: performing normalization processing on the second convolution result to obtain a second normalization result; and performing down-sampling processing on the second normalization result to obtain a second down-sampling result.

In operation S1323, second feature information is obtained based on the second down-sampling result.

In some embodiments, the second down-sampling result may be input to a fully connected layer, and full connection processing is performed on the second down-sampling result by means of the fully connected layer to obtain second feature information.

Figure 7:
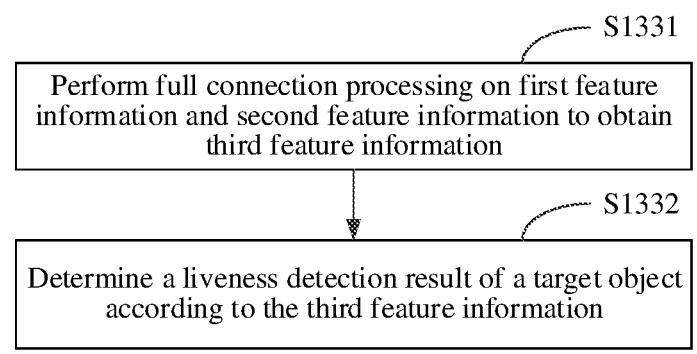
FIG. 7 shows one exemplary flowchart of determining a liveness detection result of a target object based on first feature information and second feature information in the method for liveness detection according to embodiments of the present disclosure.

FIG. 7 shows one exemplary flowchart of determining the liveness detection result of the target object based on first feature information and second feature information in the method for liveness detection according to embodiments of the present disclosure. As shown in FIG. 7, determining a liveness detection result of a target object based on first feature information and second feature information may include operations S1331 and S1332.

In operation S1331, full connection processing is performed on first feature information and second feature information to obtain third feature information.

In some embodiments, full connection processing may be performed on first feature information and second feature information by means of the fully connected layer to obtain third feature information.

In operation S1332, a liveness detection result of a target object is determined based on the third feature information.

Figure 8:
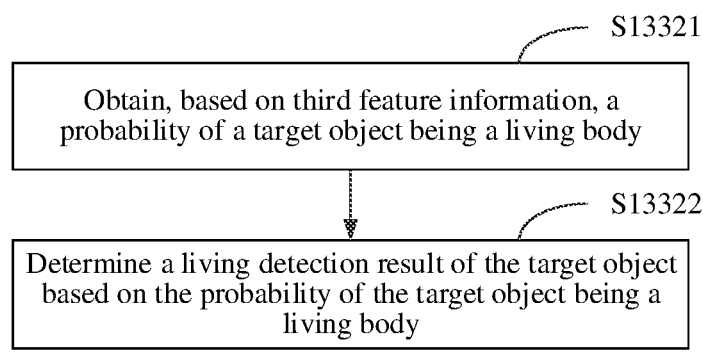
FIG. 8 shows one exemplary flowchart of determining a liveness detection result of a target object according to third feature information in the method for liveness detection according to embodiments of the present disclosure.

FIG. 8 shows one exemplary flowchart of determining a liveness detection result of a target object according to third feature information in the method for liveness detection according to embodiments of the present disclosure. As shown in FIG. 8, determining a liveness detection result of a target object according to third feature information may include operations S13321 and S13322.

In operation S13321, a probability of a target object being a living body is obtained based on third feature information.

In some embodiments, third feature information may be input to a Softmax layer, and a probability of a target object being a living body may be obtained by means of the Softmax layer.

As an example, the Softmax layer may include two neurons, where one neuron represents the probability of the target object being a living body, and the other neuron represents a probability of the target object being a non-living body.

In operation S13322, a liveness detection result of the target object is determined according to the probability of the target object being a living body.

In some embodiments, determining the liveness detection result of the target object according to the probability of the target object being a living body includes: if the probability of the target object being a living body is greater than a fourth threshold, determining that the liveness detection result of the target object is the target object being a living body; and if the probability of the target object being a living body is less than or equal to the fourth threshold, determining that the liveness detection result of the target object is the target object being a non-living body.

It should be noted that, although the implementation of operation S1332 is described above with the procedures shown in FIG. 8, persons skilled in the art can understand that the present disclosure is not limited thereto. In some other embodiments, the probability of the target object being a non-living body may be obtained based on the third feature information, and the liveness detection result of the target object is determined according to the probability of the target object being a non-living body. In the implementation, if the probability of the target object being a non-living body is greater than a fifth threshold, it is determined that the liveness detection result of the target object is the target object being a non-living body; and if the probability of the target object being a non-living body is less than or equal to the fifth threshold, it is determined that the liveness detection result of the target object is the target object being a living body.

The embodiments of the present disclosure can fundamentally defend spoofing attacks with invalid depth maps, thereby improving the accuracy of liveness detection, and achieving higher security and reliability.

It should be understood that, the foregoing various method embodiments mentioned in the present disclosure may be combined with each other to form a combined embodiment without departing from the principle logic. Details are not described repeatedly due to space limitation.

In addition, the present disclosure further provides an apparatus for liveness detection, a system for liveness detection, an electronic device, a computer-readable storage medium, and a program, which can all be used to implement any of the method for liveness detection provided in the present disclosure. For corresponding technical solutions and descriptions, please refer to the corresponding content in the method section. Details are not described repeatedly.

Figure 9:
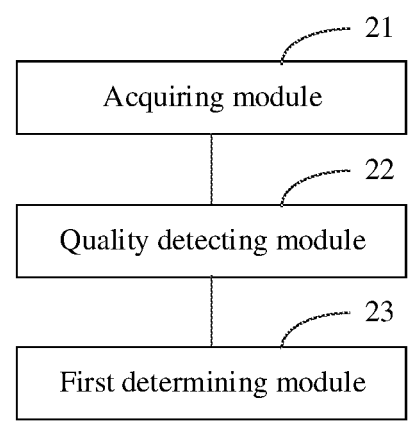
FIG. 9 shows a block diagram of an apparatus for liveness detection according to embodiments of the present disclosure.

FIG. 9 shows a block diagram of an apparatus for liveness detection according to embodiments of the present disclosure. As shown in FIG. 9, the apparatus includes: an acquiring module 21, configured to acquire a first depth map captured by a depth sensor and a first target image captured by an image sensor; a quality detecting module 22, configured to perform quality detection on the first depth map to obtain a quality detection result of the first depth map; and a first determining module 23, configured to determine a liveness detection result of a target object in the first target image based on the quality detection result of the first depth map.

In some embodiments, the depth sensor is a Time-of-Flight (ToF) sensor or a structured light sensor.

In some embodiments, the image sensor is an RGB sensor or a near-infrared sensor.

Figure 10:
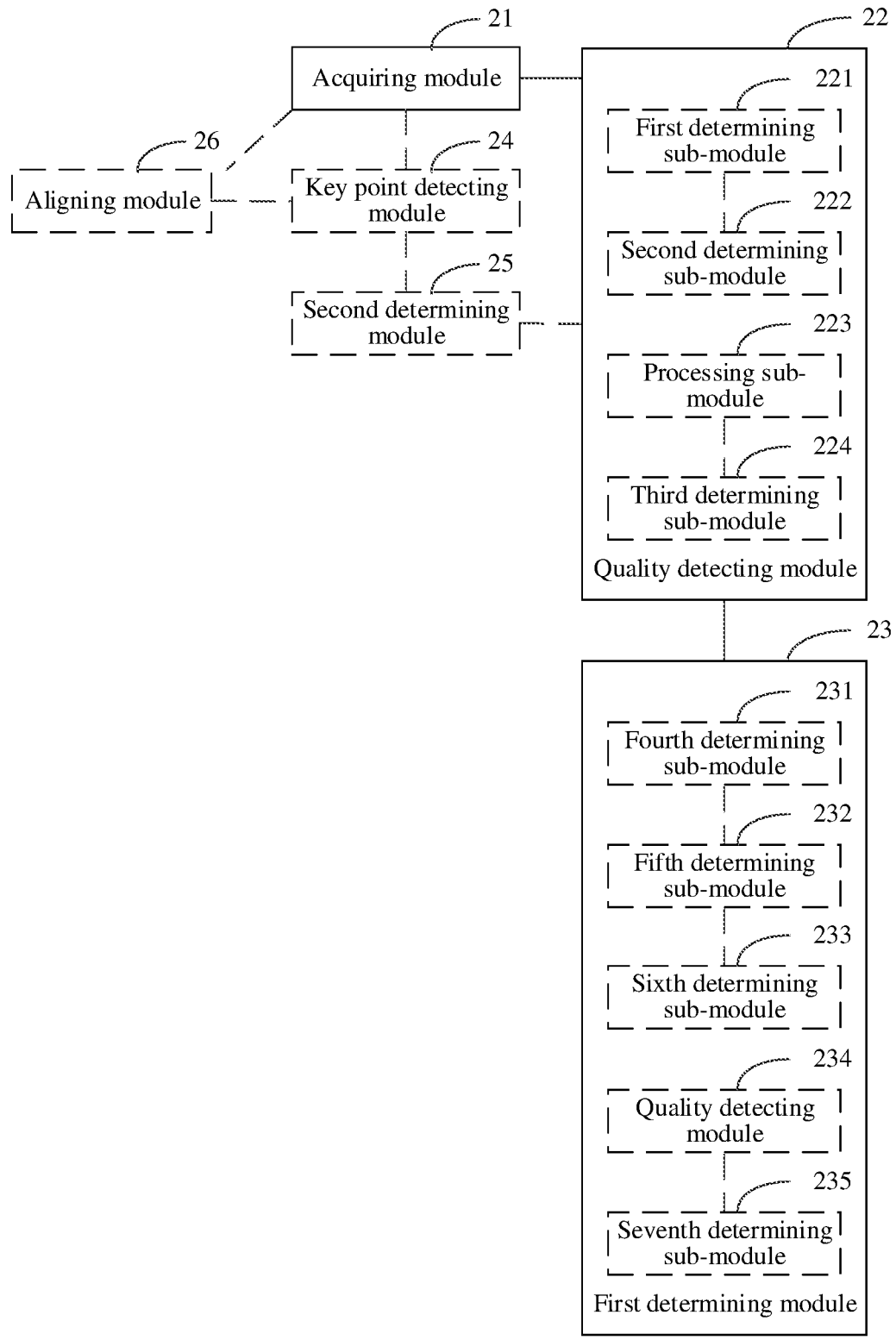
FIG. 10 shows one exemplary block diagram of the apparatus for liveness detection according to embodiments of the present disclosure.

FIG. 10 shows one exemplary block diagram of an apparatus for liveness detection according to embodiments of the present disclosure. As shown in FIG. 10:

In some embodiments, the quality detecting module 22 includes: a first determining sub-module 221, configured to determine at least one invalid position in a region corresponding to a target object in a first depth map; and a second determining sub-module 222, configured to obtaining a quality detection result of the first depth map based on the at least one invalid position in the region corresponding to the target object.

In some embodiments, the second determining sub-module 222 is configured to: obtain a quality detection result of the first depth map based on a proportion, in the region corresponding to the target object, of the at least one invalid position in the region corresponding to the target object.

In some embodiments, the second determining sub-module 222 is configured to: obtain the quality detection result of the first depth map based on the at least one invalid position in the region corresponding to the target object and the weight corresponding to the at least one invalid position.

In some embodiments, the first determining sub-module 221 is configured to: determine a position in the region corresponding to the target object, which has a depth value equal to zero, as the invalid position.

In some embodiments, the apparatus further includes: a key point detecting module 24, configured to perform key point detection on a first target image to obtain key point information of the target object; and a second determining module 25, configured to determine, based on the key point information of the target object, the region corresponding to the target object from the first depth map.

In some embodiments, the quality detecting module 22 includes: a processing sub-module 223, configured to process the first depth map through a first neural network to obtain a quality confidence score corresponding to the first depth map; and a third determining sub-module 224, configured to obtain the quality detection result of the first depth map based on the quality confidence score corresponding to the first depth map.

In some embodiments, the third determining sub-module 224 is configured to: in response to the quality confidence score corresponding to the first depth map being greater than a first threshold, determine that the quality detection result of the first depth map is qualified in quality; and/or in response to the quality confidence score corresponding to the first depth map being less than or equal to the first threshold, determine that the quality detection result of the first depth map is unqualified in quality.

In some embodiments, the apparatus further includes: an aligning module 26, configured to align the first depth map with the first target image according to a parameter of a depth sensor and a parameter of an image sensor.

In some embodiments, the first determining module 23 is configured to: in response to the quality detection result of the first depth map being qualified in quality, obtain a liveness detection result of the target object based on the first depth map and the first target image.

In some embodiments, the first determining module 23 is configured to: obtain the liveness detection result of the target object based on the first depth map and the key point information of the target object contained in the first target image.

In some embodiments, the first determining module 23 includes: a fourth determining sub-module 231, configured to obtain the first feature information based on the first depth map and the key point information of the target object; a fifth determining sub-module 232, configured to obtain second feature information based on the key point information of the target object; and a sixth determining sub-module 233, configured to obtain the liveness detection result of the target object based on the first feature information and the second feature information.

In some embodiments, the fourth determining sub-module 231 is configured to: process the first depth map and the key point information of the target object through a second neural network to obtain the first feature information; and the fifth determining sub-module 232 is configured to: process the first target image and the key point information of the target object through a third neural network to obtain the second feature information.

In some embodiments, the fourth determining sub-module 231 is configured to: perform convolution processing on the first depth map and the key point information of the target object to obtain a first convolution result; perform down-sampling processing on the first convolution result to obtain a first down-sampling result; and obtain the first feature information based on the first down-sampling result.

In some embodiments, the fifth determining sub-module 232 is configured to: perform convolution processing on the first target image and the key point information of the target object to obtain a second convolution result; perform down-sampling processing on the second convolution result to obtain a second down-sampling result; and obtain the second feature information based on the second down-sampling result.

In some embodiments, the sixth determining sub-module 233 is configured to: perform full connection processing on the first feature information and the second feature information to obtain third feature information; and determine the liveness detection result of the target object according to the third feature information.

In some embodiments, the sixth determining sub-module 233 is configured to: obtain, based on the third feature information, a probability of a target object being a living body; and determine the liveness detection result of the target object according to the probability of the target object being a living body.

In some embodiments, the first determining module 23 is configured to: in response to the quality detection result of the first depth map being unqualified in quality, perform liveness detection on the target object, without using the first depth map, to obtain the liveness detection result of the target object.

In some embodiments, the first determining module 23 is configured to: in response to the quality detection result of the first depth map being unqualified in quality and number of retries of the quality detection on a video sequence to which the first target image belongs reaches a second threshold, determining that the liveness detection result of the target object is that the target object is a non-living body, or performing liveness detection on the target object, without using the first depth map, to obtain the liveness detection result of the target object.

In some embodiments, the first determining module 23 includes: a quality detection sub-module 234, configured to, in response to the quality detection result of the first depth map being unqualified in quality and the number of retries of the quality detection of the video sequence to which the first target image belongs does not reach the second threshold, perform quality detection on a second depth map corresponding to a second target image in the video sequence to which the target image belongs to obtain a quality detection result of the second depth map; and a seventh determining sub-module 235, configured to obtain the liveness detection result of the target object based on the quality detection result of the second depth map.

According to the embodiments of the present disclosure, a first depth map captured by a depth sensor and a first target image captured by an image sensor are acquired, quality detection is performed on the first depth map to obtain a quality detection result of the first depth map, and a liveness detection result of a target object in the first target image is determined based on the quality detection result of the first depth map, thereby improving the accuracy of liveness detection.

In some embodiments, the apparatus is configured to execute the various possible methods described above. Accordingly, the apparatus includes units or modules configured to implement various possible operations or procedures in the methods described above. For the purpose of brevity, details are not described herein repeatedly.

The embodiments of the present disclosure further provide an electronic device, including: a processor; and a memory configured to store processor-executable instructions; where the processor is configured to execute the foregoing methods.

The embodiments of the present disclosure further provide a computer-readable storage medium, having computer program instructions stored thereon, where when the computer program instructions are executed by a processor, the foregoing methods are implemented. The computer-readable storage medium may be a non-volatile computer-readable storage medium.

The embodiments of the present disclosure further provide a system for liveness detection, comprising: the foregoing electronic device, a depth sensor, and an image sensor.

The embodiments of the present disclosure further provide a system for liveness detection, comprising: the foregoing computer-readable storage medium, a depth sensor, and an image sensor.

Figure 11:
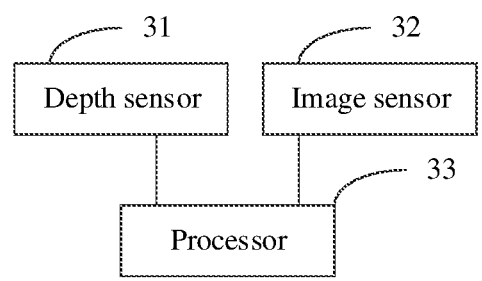
FIG. 11 shows one exemplary block diagram of an electronic device according to embodiments of the present disclosure.

FIG. 11 shows one exemplary block diagram of an electronic device according to embodiments of the present disclosure. As shown in FIG. 11, the electronic device includes: a depth sensor 31, configured to detect a depth map of a target object; an image sensor 32, configured to capture a target image of the target object; and a processor 33, configured to perform quality detection on a first depth map to a quality detection result of the first depth map, and to determine a liveness detection result of the target object in a first target object based on the quality detection result of the first depth map.

In some embodiments, the depth sensor is a Time-of-Flight (ToF) sensor or a structured light sensor.

In some embodiments, the image sensor is an RGB sensor or a near-infrared sensor.

In some embodiments, the processor 33 is further configured to: determine at least one invalid position in a region corresponding to a target object in the first depth map; and obtain the quality detection result of the first depth map based on the at least one invalid position in the region corresponding to the target object.

In some embodiments, the processor 33 is configured to: obtain the quality detection result of the first depth map based on a proportion, in the region corresponding to the target object, of the at least one invalid position in the region corresponding to the target object.

In some embodiments, the processor 33 is configured to: obtain the quality detection result of the first depth map based on the at least one invalid position in the region corresponding to the target object and the weight corresponding to the at least one invalid position.

In some embodiments, the processor 33 is configured to: determine a position in the region corresponding to the target object, which has a depth value equal to zero, as the invalid position.

In some embodiments, the processor 33 is further configure to: perform key point detection on the first target image to obtain key point information of the target object; and determine, based on the key point information of the target object, the region corresponding to the target object from the first depth map.

In some embodiments, the processor 33 is configured to: process the first depth map through a first neural network to obtain a quality confidence score corresponding to the first depth map; and obtain the quality detection result of the first depth map based on the quality confidence score corresponding to the first depth map.

In some embodiments, the processor 33 is configured to: determine that the quality detection result of the first depth map is qualified in quality in response to the quality confidence score corresponding to the first depth map being greater than a first threshold; and/or in response to the quality confidence score corresponding to the first depth map being less than or equal to the first threshold, determine that the quality detection result of the first depth map is unqualified in quality.

In some embodiments, the processor 33 is further configured to: align the first depth map with the first target image according to a parameter of the depth sensor and a parameter of the image sensor.

In some embodiments, the processor 33 is configured to: in response to the quality detection result of the first depth map being qualified in quality, obtain the liveness detection result of the target object based on the first depth map and the first target image and key point information of the target object contained in the first target image.

In some embodiments, the processor 33 is configured to: obtain first feature information based on the first depth map and the key point information of the target object; obtain second feature information based on the key point information of the target object; and determine the liveness detection result of the target object based on the first feature information and the second feature information.

In some embodiments, the processor 33 is configured to: process the first depth map and the key point information of the target object through a second neural network to obtain first feature information; and the obtaining second feature information based on the key point information of the target object includes: processing the first target image and the key point information of the target object through a third neural network to obtain second feature information.

In some embodiments, the processor 33 is configured to: perform convolution processing on the first depth map and the key point information of the target object to obtain a first convolution result; perform down-sampling processing on the first convolution result to obtain a first down-sampling result; and obtain the first feature information based on the first down-sampling result.

In some embodiments, the processor 33 is configured to: perform convolution processing on the first target image and the key point information of the target object to obtain a second convolution result; perform down-sampling processing on the second convolution result to obtain a second down-sampling result; and obtain the second feature information based on the second down-sampling result.

In some embodiments, the processor 33 is configured to: perform full connection processing on the first feature information and the second feature information to obtain third feature information; and determine the liveness detection result of the target object according to the third feature information.

In some embodiments, the processor 33 is configured to: obtain, based on the third feature information, a probability of the target object being a living body; and determine the liveness detection result of the target object according to the probability of the target object being a living body.

In some embodiments, the processor 33 is configured to: in response to the quality detection result of the first depth map being unqualified in quality, perform liveness detection on the target object, without using the first depth map, to obtain the liveness detection result of the target object.

In some embodiments, the processor 33 is configured to: in response to the quality detection result of the first depth map being unqualified in quality and number of retries of the quality detection on a video sequence to which the first target image belongs reaches a second threshold, perform liveness detection on the target object, without using the first depth map, to obtain the liveness detection result of the target object.

In some embodiments, the processor 33 is configured to: in response to the quality detection result of the first depth map being unqualified in quality and the number of retries of the quality detection of the video sequence to which the first target image belongs does not reach the second threshold, determine that the liveness detection result of the target object is that the target object is a non-living body, or perform quality detection on a second depth map corresponding to a second target image in the video sequence to which the target image belongs to obtain a quality detection result of the second depth map; and obtain the liveness detection result of the target object based on the quality detection result of the second depth map.

The electronic device may be provided as a terminal, a server, or other forms of devices.

Figure 12:
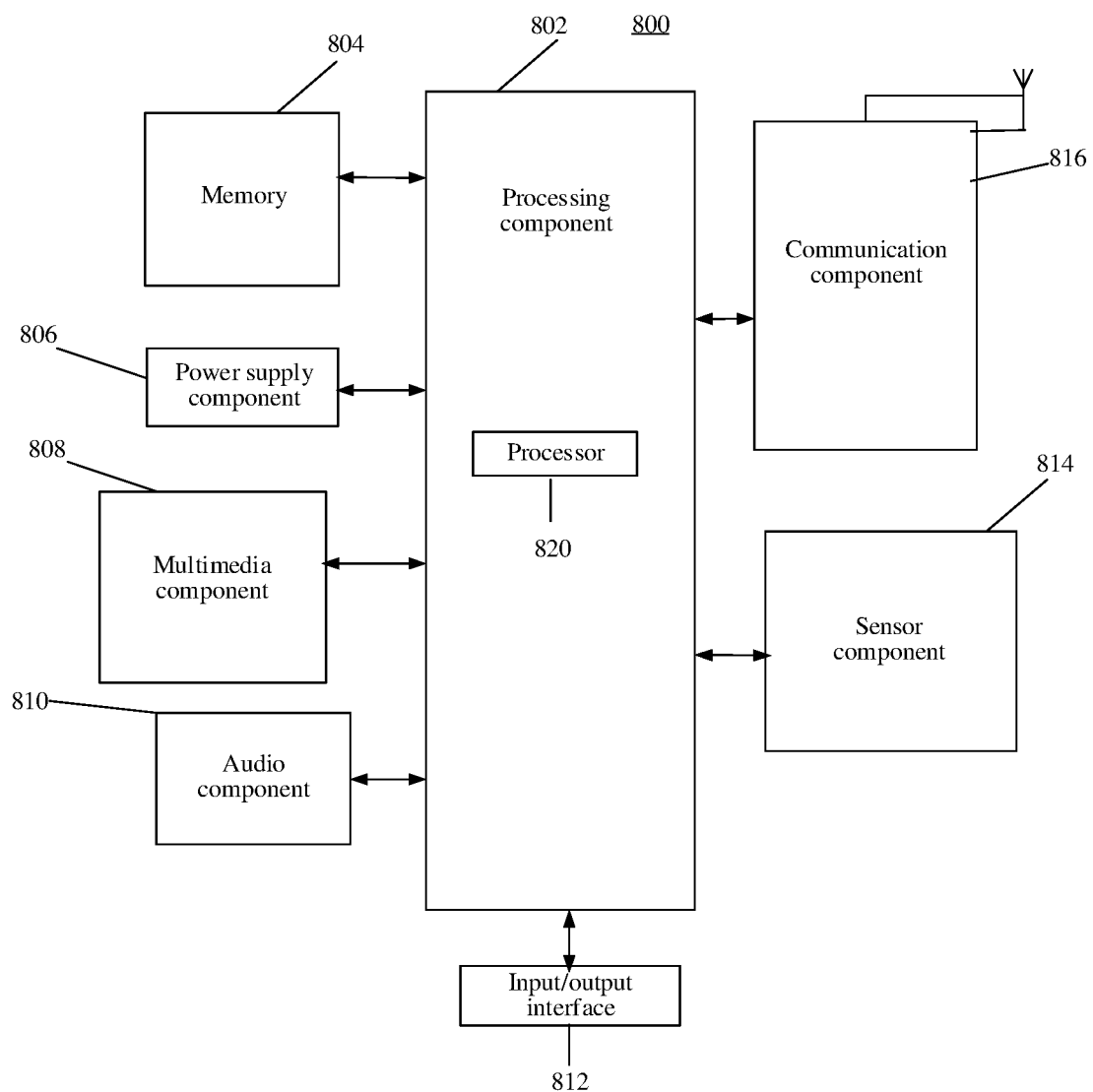
FIG. 12 shows another exemplary block diagram of the electronic device according to embodiments of the present disclosure.

FIG. 12 shows another exemplary block diagram of an electronic device according to embodiments of the present disclosure. For example, the electronic device 800 may be a terminal such as a mobile phone, a computer, a digital broadcast terminal, a message transceiving device, a game console, a tablet device, a medical device, exercise equipment, and a personal digital assistant.

With reference to FIG. 12, the electronic device 800 may include one or more of the following components: a processing component 802, a memory 804, a power supply component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the operations of the methods above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application or method operated on the electronic device 800, contact data, contact list data, messages, pictures, videos, etc. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power supply component 806 provides power for various components of the electronic device 800. The power supply component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect a position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In one exemplary embodiment, the communication component 816 receives a broadcast signal or broadcast-related information from an external broadcast management system by means of a broadcast channel. In one exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In an exemplary embodiment, the electronic device 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the foregoing methods.

In an exemplary embodiment, further provided is a non-volatile computer-readable storage medium, for example, a memory 804 including computer program instructions, which can be executed by the processor 820 of the electronic device 800 to implement the methods above.

The present disclosure may be a system, a method, and/or a computer program product. The computer program product may include a computer-readable storage medium having computer-readable program instructions thereon for causing a processor to carry out the aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include: a portable computer diskette, a hard disk, a Random Access Memory (RAM), an ROM, an EPROM (or a flash memory), a SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a Local Area Network (LAN), a Wide Area Network (WAN) and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within each computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may be executed entirely on the user's computer, partly on the user's computer, as a stand-alone software package, partly on the user's computer and partly on a remote computer or entirely on the remote computer or server. In a scenario involving a remote computer, the remote computer may be connected to the user's computer through any type of network, including an LAN or a WAN, or the connection may be made to an external computer (for example, through the Internet using an Internet service provider). In some embodiments, electronic circuitry including, for example, programmable logic circuitry, FPGAs, or Programmable Logic Arrays (PLAs) may execute the computer-readable program instructions by utilizing state information of the computer-readable program instructions to personalize the electronic circuitry, in order to implement the aspects of the present disclosure.

The aspects of the present disclosure are described herein with reference to flowcharts and/or block diagrams of methods, apparatuses (systems), and computer program products according to the embodiments of the present disclosure. It should be understood that, each block of the flowcharts and/or block diagrams, and combinations of blocks in the flowcharts and/or block diagrams, may be implemented by computer-readable program instructions.

These computer-readable program instructions may be provided to a processor of a general-purpose computer, special-purpose computer, or other programmable data processing apparatus to produce a machine, such that the instructions, which are executed via the processor of the computer or other programmable data processing apparatus, create means for implement the functions/acts specified in one or more blocks of the flowcharts and/or block diagrams. These computer-readable program instructions may also be stored in a computer-readable storage medium that can cause a computer, a programmable data processing apparatus, and/or other devices to function in a particular manner, such that the computer-readable medium having instructions stored therein includes an article of manufacture including instructions which implement the aspects of the functions/acts specified in one or more blocks of the flowcharts and/or block diagrams.

The computer-readable program instructions may also be loaded onto a computer, other programmable data processing apparatus, or other device to cause a series of operational operations to be performed on the computer, other programmable apparatus or other device to produce a computer implemented process, such that the instructions which can be executed on the computer, other programmable apparatus or other device implement the functions/acts specified in one or more blocks of the flowcharts and/or block diagrams.

The flowcharts and block diagrams in the accompanying drawings illustrate the architecture, functionality, and operations of possible implementations of systems, methods, and computer program products according to multiple embodiments of the present disclosure. In this regard, each block in the flowcharts or block diagrams may represent a module, program segment, or a portion of the instructions, which includes one or more executable instructions for implementing the specified logical function(s). In some alternative implementations, the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, may be implemented by special purpose hardware-based systems that perform the specified functions or acts or carried out by combinations of special purpose hardware and computer instructions.

The descriptions of the embodiments of the present disclosure have been presented for purposes of illustration, but are not intended to be exhaustive or limited to the embodiments disclosed. Many modifications and variations will be apparent to a person of ordinary skill in the art without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

The invention claimed is:

1. A method for liveness detection, comprising:
   acquiring a first depth map captured by a depth sensor and a first target image captured by an image sensor;
   performing quality detection on the first depth map to obtain a quality detection result of the first depth map; and
   determining a liveness detection result of a target object in the first target image based on the quality detection result of the first depth map,
   wherein performing quality detection on the first depth map to obtain the quality detection result of the first depth map comprises:
      determining at least one invalid position in a region corresponding to the target object in the first depth map; and
      obtaining the quality detection result of the first depth map based on the at least one invalid position in the region corresponding to the target object,
   wherein obtaining the quality detection result of the first depth map based on the at least one invalid position in the region corresponding to the target object comprises:
      obtaining the quality detection result of the first depth map based on the at least one invalid position in the region corresponding to the target object and a weight corresponding to the at least one invalid position.

2. The method according to claim 1, wherein the depth sensor is a Time-of-Flight (ToF) sensor or a structured light sensor, or wherein the image sensor is a Red-Green-Blue (RGB) sensor or a near-infrared sensor.

3. The method according to claim 1, wherein obtaining the quality detection result of the first depth map based on the at least one invalid position in the region corresponding to the target object further comprises:
   obtaining the quality detection result of the first depth map based on a proportion of the at least one invalid position in the region corresponding to the target object.

4. The method according to claim 1, wherein determining the at least one invalid position in the region corresponding to the target object in the first depth map comprises:
   determining a position in the region corresponding to the target object, which has a depth value equal to zero, as the invalid position.

5. The method according to claim 1, further comprising:
   performing key point detection on the first target image to obtain key point information of the target object; and
   determining, based on the key point information of the target object, the region corresponding to the target object from the first depth map.

6. The method according to claim 1, wherein performing quality detection on the first depth map to obtain the quality detection result of the first depth map further comprises:
   processing the first depth map through a first neural network to obtain a quality confidence score corresponding to the first depth map; and
   obtaining the quality detection result of the first depth map based on the quality confidence score corresponding to the first depth map.

7. The method according to claim 1, wherein determining the liveness detection result of the target object in the first target image based on the quality detection result of the first depth map comprises:

in response to the quality detection result of the first depth map being qualified in quality, obtaining the liveness detection result of the target object based on the first depth map and the first target image.

8. The method according to claim 7, wherein obtaining the liveness detection result of the target object based on the first depth map and the first target image comprises:
obtaining first feature information based on the first depth map;
obtaining second feature information based on the first target image; and
obtaining the liveness detection result of the target object based on the first feature information and the second feature information.

9. The method according to claim 8, wherein the method is implemented through a liveness detection model, the liveness detection model comprising a second neural network, a third neural network and a classification network,
wherein obtaining the first feature information based on the first depth map comprises:
processing the first depth map through the second neural network to obtain the first feature information;
wherein obtaining the second feature information based on the first target image comprises:
processing the first target image through the third neural network to obtain the second feature information; and
wherein obtaining the liveness detection result of the target object based on the first feature information and the second feature information comprises:
obtaining, through the classification network, the liveness detection result of the target object based on the first feature information and the second feature information.

10. The method according to claim 7, wherein obtaining the liveness detection result of the target object based on the first depth map and the first target image comprises:
obtaining the liveness detection result of the target object based on the first depth map and key point information of the target object contained in the first target image.

11. The method according to claim 10, wherein obtaining the liveness detection result of the target object based on the first depth map and the key point information of the target object contained in the first target image comprises:
obtaining first feature information based on the first depth map and the key point information of the target object;
obtaining second feature information based on the key point information of the target object and the first target image; and
determining the liveness detection result of the target object based on the first feature information and the second feature information.

12. The method according to claim 11, wherein obtaining the first feature information based on the first depth map and the key point information of the target object comprises:
processing the first depth map and the key point information of the target object through a second neural network to obtain the first feature information; and
obtaining the second feature information based on the key point information of the target object and the first target image comprises:
processing the first target image and the key point information of the target object through a third neural network to obtain the second feature information.

13. The method according to claim 11, wherein obtaining the first feature information based on the first depth map and the key point information of the target object comprises:
performing convolution processing on the first depth map and the key point information of the target object to obtain a first convolution result;
performing down-sampling processing on the first convolution result to obtain a first down-sampling result; and
obtaining the first feature information based on the first down-sampling result.

14. The method according to claim 11, wherein determining the liveness detection result of the target object based on the first feature information and the second feature information comprises:
performing full connection processing on the first feature information and the second feature information to obtain third feature information; and
determining the liveness detection result of the target object according to the third feature information.

15. The method according to claim 14, wherein determining the liveness detection result according to the third feature information comprises:
obtaining, based on the third feature information, a probability of the target object being a living body; and
determining the liveness detection result of the target object according to the probability of the target object being a living body.

16. The method according to claim 1, wherein determining the liveness detection result of the target object in the first target image based on the quality detection result of the first depth map comprises:
in response to the quality detection result of the first depth map being unqualified in quality, performing, liveness detection on the target object, without using the first depth map, to obtain the liveness detection result of the target object.

17. The method according to claim 1, wherein determining the liveness detection result of the target object in the first target image based on the quality detection result of the first depth map comprises:
in response to the quality detection result of the first depth map being unqualified in quality and a number of retries of the quality detection on a video sequence to which the first target image belongs reaching a second threshold, determining that the liveness detection result of the target object is that the target object is a non-living body, or performing liveness detection on the target object, without using the first depth map, to obtain the liveness detection result of the target object.

18. An apparatus for liveness detection, comprising:
a memory storing processor-executable instructions; and
a processor arranged to execute the stored processor-executable instructions to perform operations of:
acquiring a first depth map captured by a depth sensor and a first target image captured by an image sensor;
performing quality detection on the first depth map to obtain a quality detection result of the first depth map; and
determining a liveness detection result of a target object in the first target image based on the quality detection result of the first depth map,
wherein performing quality detection on the first depth map to obtain the quality detection result of the first depth map comprises:

determining at least one invalid position in a region corresponding to the target object in the first depth map; and obtaining the quality detection result of the first depth map based on the at least one invalid position in the region corresponding to the target object, wherein obtaining the quality detection result of the first depth map based on the at least one invalid position in the region corresponding to the target object comprises:

obtaining the quality detection result of the first depth map based on the at least one invalid position in the region corresponding to the target object and a weight corresponding to the at least one invalid position.

19. The apparatus according to claim 18, wherein the depth sensor is a Time-of-Flight (ToF) sensor or a structured light sensor, or wherein the image sensor is a Red-Green-Blue (RGB) sensor or a near-infrared sensor.

20. A non-transitory computer-readable storage medium, having stored thereon computer program instructions that, when executed by a computer, cause the computer to perform the following:

acquiring a first depth map captured by a depth sensor and a first target image captured by an image sensor;

performing quality detection on the first depth map to obtain a quality detection result of the first depth map; and determining a liveness detection result of a target object in the first target image based on the quality detection result of the first depth map, wherein performing quality detection on the first depth map to obtain the quality detection result of the first depth map comprises:

determining at least one invalid position in a region corresponding to the target object in the first depth map; and obtaining the quality detection result of the first depth map based on the at least one invalid position in the region corresponding to the target object, wherein obtaining the quality detection result of the first depth map based on the at least one invalid position in the region corresponding to the target object comprises:

obtaining the quality detection result of the first depth map based on the at least one invalid position in the region corresponding to the target object and a weight corresponding to the at least one invalid position.

* * * * *